UNITED STATES PATENT OFFICE.

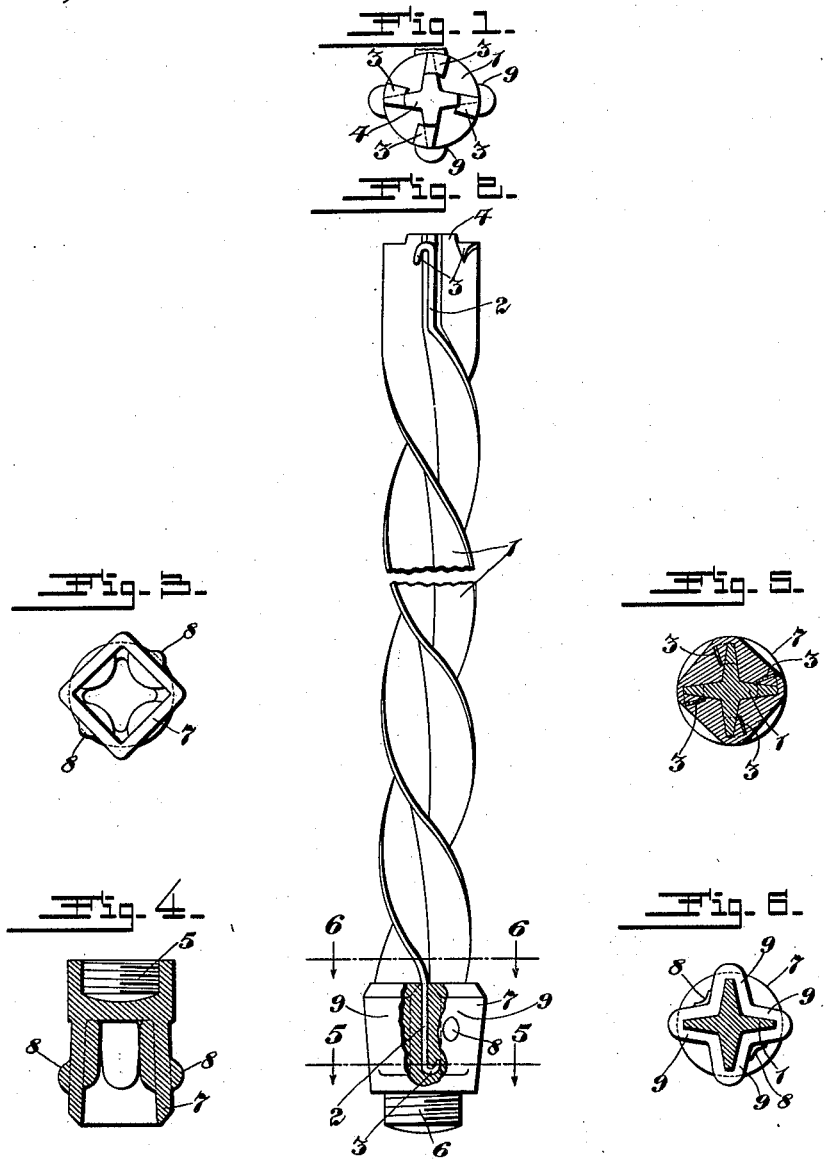

SIDNEY D. KRETZER, OF ST. LOUIS, MISSOURI.

LIGHTNING-ROD COUPLING.

1,313,391.  Specification of Letters Patent.  Patented Aug. 19, 1919.

Application filed June 17, 1918. Serial No. 240,277.

*To all whom it may concern:*

Be it known that I, SIDNEY D. KRETZER, a citizen of the United States, residing at the city of St. Louis and State of Missouri, have invented a new and useful Lightning-Rod Coupling, of which the following is a specification.

This invention relates to improvements in lightning rod couplings, and consists in the novel construction hereinafter disclosed.

An object of the invention is to provide a lightning rod coupling comprising complementary sections adapted to be screwed together and attached to the extremities of sections of flanged lightning rod in such a way that the union between the coupling sections and the rod will be intimate, affording a close electric connection between the rod and the coupling sections.

Additional advantages from the construction of the invention will be apparent from the following detailed disclosure taken in connection with the accompanying drawing, in which—

Figure 1 is a plan view of an end of a flanged lightning rod section before the coupling section is applied thereto.

Fig. 2 is a compressed vertical section illustrating a flanged rod section of lightning rod showing one end thereof in condition to receive a coupling section, and the other end thereof having a coupling section applied thereto.

Fig. 3 is a bottom plan view of a coupling section in condition to be applied to the end of a lightning rod section.

Fig. 4 is a vertical section of a lightning rod coupling section before application to the section of flanged lightning rod.

Fig. 5 is a cross section through the end of the lightning rod and coupling section taken substantially on the line 5—5 of Fig. 2.

Fig. 6 is a cross section through the lightning rod above the coupling section taken substantially on the line 6—6 of Fig. 2.

In the embodiment of the invention illustrated in the drawing a flanged section 1 of lightning rod is prepared for the reception at each end of a coupling section by twisting the flanged rod, which in original form has the flanges beveled in spiral shape, so that for a distance from the end of the rod the flanges will extend vertically as indicated at 2.

Each of the upper edges of the flanges near their outer extremities is turned over by mechanical means to form down-turned lips 3 leaving a central star-shaped core 4 extending above the turned edges of the lips 3.

The coupling sections are formed in pairs, one of the members of each pair having a threaded socket portion 5 adapted to receive a threaded extension 6 on the other section of the pair. The body portion of each of the coupling sections before application to the rod forms a recess 7 rectangular in cross section. Upon opposite side walls of the recess 7 are beads 8. The coupling sections thus formed are fitted over the ends of the lightning rod section so that the vertically extending flanges at the extremities of the rod section seat in the corners formed by the walls of the recess. These coupling sections are preferably made of brass or copper so that they may be swaged or crushed about the ends of the rod section by mechanical pressure.

After the coupling sections have been fitted in place over the ends of the rod the side walls of the recess are swaged or crushed inwardly as indicated at 9 by high pressure so that the walls will be forced into intimate contact with the entire surface of the end portions of the lightning rod. The pressure upon the walls of the recess 7 forces a portion of the metal of the coupling into the space between the lips 3 and the flanges, so that after the couping section has been applied to the rod in this manner it is impossible for it to be pulled out of place by movement longitudinally of the rod, thus preventing breaking of the connection between the coupling section and the rod by the longitudinal stress placed upon the couplings and the rod, when the rod is mounted in position on a building.

Additional frictional engagement between the rod and the coupling sections results from the beads 8 being crushed inwardly against surfaces of the rod section.

What I claim and desire to secure by Letters Patent, is:

1. The combination of a flanged lightning rod section having the flanges near the end thereof straight and parallel with the axis of the rod, lips extending laterally from the flanges of the section near the end of the section, a star shaped core between said lips and the end of the section, and a coupling having a rectangular recess adapted to fit over the ends of the rod section and to receive the straight portions of the flanges in the corners of said recess, the walls of said recess being crushed inwardly to embed said lips and to engage in the spaces between said lips and said flanges.

2. A metal connector for lightning rod sections having a recess in one end for the reception of the end of a flanged rod section, said recess being rectangular at its open end, and a bead extending inwardly from each wall of the recess from the bottom of the recess and terminating at a distance from the ends of the walls and being of decreasing thickness toward their outer ends, said beads being adapted to be pressed into contact with the end of the rod section.

3. The combination of a flanged lightning rod section having the flanges near the ends thereof straight and parallel with the axis of the rod, lips extending laterally from said flanges near the end of the section, a star shaped core between said lips and the end of the section, and a coupling having a recess therein which is rectangular at its upper end and which has fillers extending inwardly from the side walls thereof for a distance from the bottom of the recess adapted to be pressed around said lips and around the arms of said core.

SIDNEY D. KRETZER.

Copies of this patent may be obtained for five cents each, by addressing the "Commissioner of Patents, Washington, D. C."